(12) United States Patent
Kanevsky et al.

(10) Patent No.: US 9,607,175 B2
(45) Date of Patent: Mar. 28, 2017

(54) PRIVACY SAFETY MANAGER SYSTEM

(75) Inventors: Dimitri Kanevsky, Ossining, NY (US); Sara H. Basson, White Plains, NY (US); Edward E. Kelley, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1481 days.

(21) Appl. No.: 11/751,197

(22) Filed: May 21, 2007

(65) Prior Publication Data

US 2008/0294715 A1    Nov. 27, 2008

(51) Int. Cl.
*G06F 17/00*    (2006.01)
*G06F 21/62*    (2013.01)

(52) U.S. Cl.
CPC ................. *G06F 21/6263* (2013.01)

(58) Field of Classification Search
CPC .............. G06Q 30/02; G06F 17/243
USPC ................ 715/200, 255, 221–222, 224
See application file for complete search history.

(56) References Cited

U.S. PATENT DOCUMENTS

| | | | |
|---|---|---|---|
| 5,425,102 A * | 6/1995 | Moy ........................... | 713/183 |
| 5,774,525 A * | 6/1998 | Kanevsky et al. ......... | 379/88.02 |
| 6,065,056 A | 5/2000 | Bradshaw et al. | |
| 6,332,192 B1 * | 12/2001 | Boroditsky et al. .......... | 713/168 |
| 6,611,881 B1 | 8/2003 | Gottfurcht et al. | |
| 7,200,599 B2 * | 4/2007 | Simon .................. | G06F 21/316 707/754 |
| 7,461,399 B2 * | 12/2008 | Juels et al. ......... | 726/9 |
| 7,467,401 B2 * | 12/2008 | Cicchitto ............ | 726/4 |
| 7,536,642 B2 | 5/2009 | Wilbrink et al. | |
| 7,553,232 B2 | 6/2009 | Kelley et al. | |
| 7,594,120 B2 * | 9/2009 | Brown et al. ................. | 713/183 |
| 7,610,491 B1 * | 10/2009 | Tsao ............................ | 713/184 |
| 7,669,057 B2 | 2/2010 | Kelley et al. | |
| 7,797,305 B2 | 9/2010 | Basson et al. | |
| 7,823,201 B1 * | 10/2010 | Xu ....................... | G06F 21/554 713/186 |
| 7,845,005 B2 | 11/2010 | Kelley et al. | |
| 7,853,984 B2 * | 12/2010 | Antell et al. ...................... | 726/2 |
| 7,878,412 B2 | 2/2011 | Kanevsky et al. | |
| 7,913,155 B2 | 3/2011 | Basson et al. | |
| 7,958,539 B2 * | 6/2011 | Gavrilos et al. .................. | 726/2 |
| 8,132,265 B2 * | 3/2012 | Wootton et al. ................ | 726/28 |
| 8,295,898 B2 * | 10/2012 | Ashfield et al. ........... | 455/575.6 |
| 2001/0044787 A1 | 11/2001 | Shwartz et al. | |

(Continued)

FOREIGN PATENT DOCUMENTS

WO    2006083115 A1    8/2006

*Primary Examiner* — Manglesh M Patel
(74) *Attorney, Agent, or Firm* — Cantor Colburn LLP

(57) ABSTRACT

A method is provided for accessing user personal information. In such method, personal information belonging to a particular user is stored at a user information processing system such as a user computer. A form may then be displayed on the user information processing system. A user-provided recall input can then be received at the user information processing system and the fact of its receipt can be indicated on the form. Using the recall input, the stored user personal information can be accessed for processing in connection with the displayed form. Display of information at the user information processing system may then be manipulated based on a result of the processing.

14 Claims, 2 Drawing Sheets

(56) References Cited

U.S. PATENT DOCUMENTS

| | | |
|---|---|---|
| 2003/0084172 A1 | 5/2003 | deJong et al. |
| 2003/0154406 A1* | 8/2003 | Honarvar et al. ............ 713/201 |
| 2004/0030934 A1* | 2/2004 | Mizoguchi et al. .......... 713/202 |
| 2004/0034794 A1 | 2/2004 | Mayer et al. |
| 2004/0078775 A1* | 4/2004 | Chow et al. .................. 717/100 |
| 2005/0114679 A1* | 5/2005 | Bagga et al. ................. 713/184 |
| 2005/0154897 A1* | 7/2005 | Holloway et al. ............ 713/183 |
| 2005/0216768 A1* | 9/2005 | Eppert .......................... 713/201 |
| 2006/0041932 A1* | 2/2006 | Cromer et al. ................... 726/6 |
| 2006/0068755 A1 | 3/2006 | Shraim et al. |
| 2006/0168455 A1* | 7/2006 | Kelley .................. G06F 21/31 |
| | | 713/183 |
| 2006/0236236 A1 | 10/2006 | Wilbrink et al. |
| 2007/0022300 A1* | 1/2007 | Eppert et al. ................. 713/183 |
| 2007/0083670 A1 | 4/2007 | Kelley et al. |
| 2007/0240212 A1* | 10/2007 | Matalytski ............. G06F 21/83 |
| | | 726/22 |
| 2007/0245343 A1* | 10/2007 | Shannon ................ G06F 21/83 |
| | | 717/174 |
| 2008/0196082 A1* | 8/2008 | Sandoval ............. H04L 63/102 |
| | | 726/1 |
| 2008/0289035 A1 | 11/2008 | Delia et al. |
| 2010/0005525 A1* | 1/2010 | Fischer .......................... 726/21 |
| 2010/0125906 A1* | 5/2010 | Golle et al. .................... 726/18 |

\* cited by examiner

PRIVACY SAFETY MANAGER SYSTEM

BACKGROUND OF THE INVENTION

The present invention relates to a computer-implemented system and method of managing access to personal information, such as in connection with the display of a form by a computer.

Privacy and security are becoming more important as information technology and the Internet are used increasingly to transmit personal information for commerce, banking, employment and other purposes such as obtaining health care. Legitimate merchants generally take steps to safeguard users' personal information by encrypting user personal information in transit and take steps to avoid disclosure. However, through e-mails, websites, bulletin boards, chatrooms, etc., criminals can cause malicious programs to be installed on the computers of unsuspecting users. Some types of malicious programs are designed to capture user personal information illegitimately and funnel it to criminals' hands. For example, malicious programs may incorporate a keylogger program which records keystrokes inputted by way of a keyboard. The keylogger program may then store the recorded keystrokes and transmit them to a criminal's computer for a nefarious purpose such as to steal one's credit card or debit card information or one's identity. Users' home addresses, phone numbers, birth date, etc., can be used for a number of crimes. Keylogger programs are particularly insidious, because they can run as background programs undetected for long periods of time unless users have other programs installed on their computers designed to combat this threat.

With the proliferation of programs designed to protect against malicious programs such as viruses, programs which display unwanted advertisements ("adware"), and programs which illegitimately collect data from user computers ("spyware"), even sophisticated computer users can be confused about what protections are provided by their installed protection programs. Some computer users may not even have protection programs installed on their computers. The present situation gives criminals an opportunity to steal personal information by way of keylogger programs or other programs designed to record user input.

SUMMARY OF THE INVENTION

A method is provided for accessing user personal information in accordance with an embodiment of the invention. In such embodiment, personal information belonging to a particular user is stored at a user information processing system such as a user computer. A form may then be displayed on the user information processing system. A user-provided recall input can then be received at the user information processing system and the fact of its receipt can be indicated on the form. Using the recall input, the stored user personal information can be accessed for processing in connection with the displayed form. Display of information at the user information processing system may then be manipulated based on a result of the processing.

In accordance with one embodiment, a personal information access management system is provided. In such system, a user information processing system includes a processor and a user interface having a display. The user information processing system may be connectable to a second information processing system via a network. The user information processing system may be operable to store user personal information belonging to a user. The user interface may be operable to display a form. Recall input from a user may be received through a user interface by the user information processing system, for which its receipt may be indicated on the form. Using the recall input, the user information processing system may access the stored user personal information for processing in connection with the displayed form, and display a result of such processing at the user information processing system.

DETAILED DESCRIPTION

Figure 1:
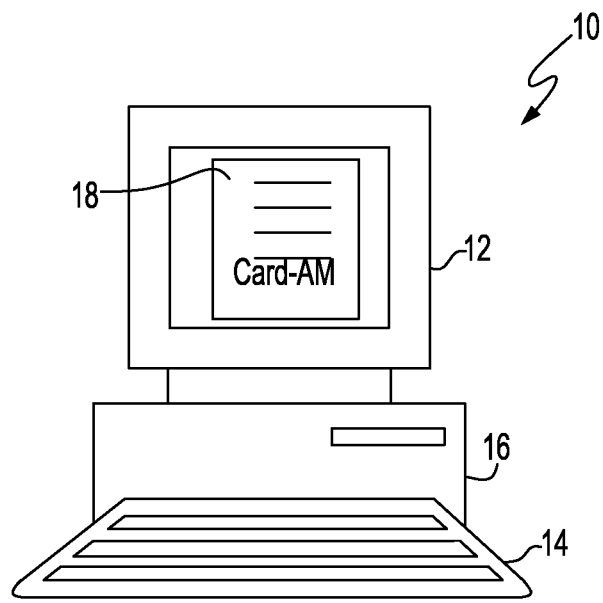
FIG. 1 is a diagrammatic elevational view of a user information processing system such as a user computer, which may serve as a part of a computing environment in which embodiments of the invention can be practiced.

FIG. 1 represents an exemplary user information processing system, e.g., user computer 10, such as a personal computer ("PC") or other microcomputer intended to be used by an end user. The user computer can have one of a variety of forms such as a desktop computer as illustrated in FIG. 1, be in form of a laptop, notebook, or penpad computer, or be even smaller, such as personal digital assistant ("PDA") type computer. All such computers have in common a user interface which includes a device, e.g., a keyboard, mouse, touchscreen display, or microphone, or combination thereof, etc., for receiving input from the user and ways for providing output such as a display, a speaker or both, etc. As illustrated in FIG. 1, user computer 10 has a display 12 and a keyboard 14. Typically, a mouse is also provided, for use as a pointing device for selecting a portion of a screen outputted on the display on a graphical user interface ("GUI'). A system unit 16 contains other parts of the computer such as a processor, storage and communications devices such as a network interface or a modem or both. The system unit 16 may be integrated together with one or more of a display and a keyboard, making a stand-alone display or keyboard unnecessary.

The display currently displays a form 18 as illustrated in FIG. 1. Forms are frequently used to communicate personal information between computer users and merchants or service providers to facilitate sales, banking and other transactions. Typically, a user inputs to the form the user's name, address, phone number and a form of payment including a card number and then causes the inputted data to be transferred to the merchant. The merchant typically obtains authorization from a bank, and then allows the transaction to proceed. In the case of a banking transaction, the bank typically uses inputted information such as an account number, userid, password, etc., for authentication before allowing access to the account. Between the user computer and the merchant, the information is usually encrypted to prevent personal information from being accessed by third parties. However, personal information inputted to the form via keyboard might be recorded surreptitiously by a malicious program such as a keylogger program.

Figure 2:
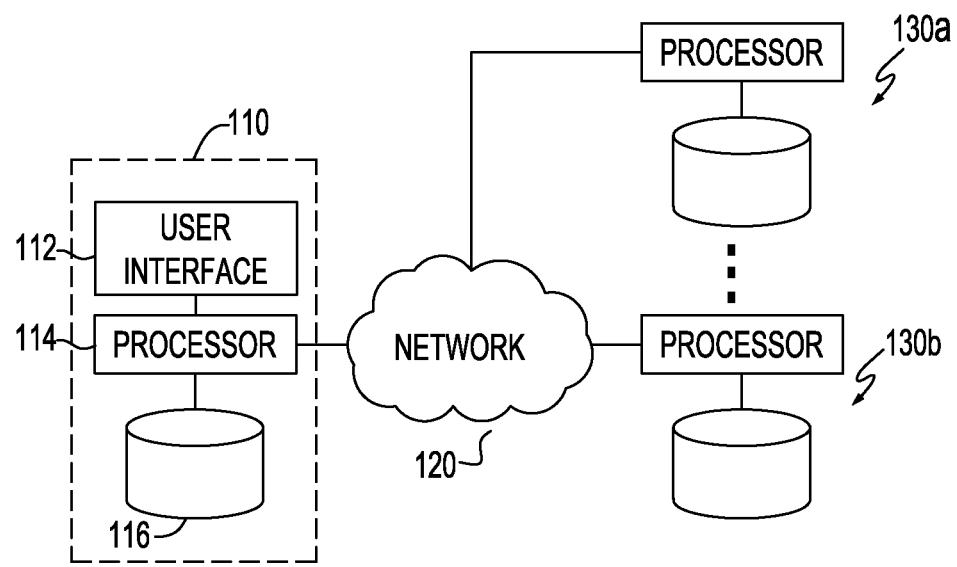
FIG. 2 is a block and schematic diagram illustrating a computing environment in which embodiments of the invention can be practiced.

FIG. 2 is a diagrammatic block diagram illustrating a computing environment which supports operation according to an embodiment of the invention. As illustrated in FIG. 2, a user computer 110 includes a user interface 112, a processor 114 and local storage 116. The user computer 110 is connectable to other computers by way of a network 120, including computers 130a, 130b. The network 120 can include a private network such as a local area network or an enterprise network, e.g., an intranet, or can include a public network such as the Internet. The network 120 can include a public or private wide area network or a network having both public and private characteristics, such as networks which operate according to a public communication protocol (e.g., Internet Protocol) but enable secure private communications by way of virtual private networking. Potentially, the user computer 110 can be in communication with many other such computers by way of the network 120. The other computers 130a, 130b may be server computers designed to handle frequent transactions with user computers, e.g., having a peak rate of more than 50 transactions per hour. Alternatively, some of the other computers 130a, 130b may be user computers or may only be arranged to handle only infrequent transactions with other user computers, e.g., at less than a peak rate of 50 transactions per hour.

Embodiments of the invention described herein can be used to protect against the aforementioned threats such as keylogger programs running on user computers. Personal information can be safeguarded from being stolen by keylogger programs by avoiding such information from being inputted by way of a keyboard.

Figure 3:
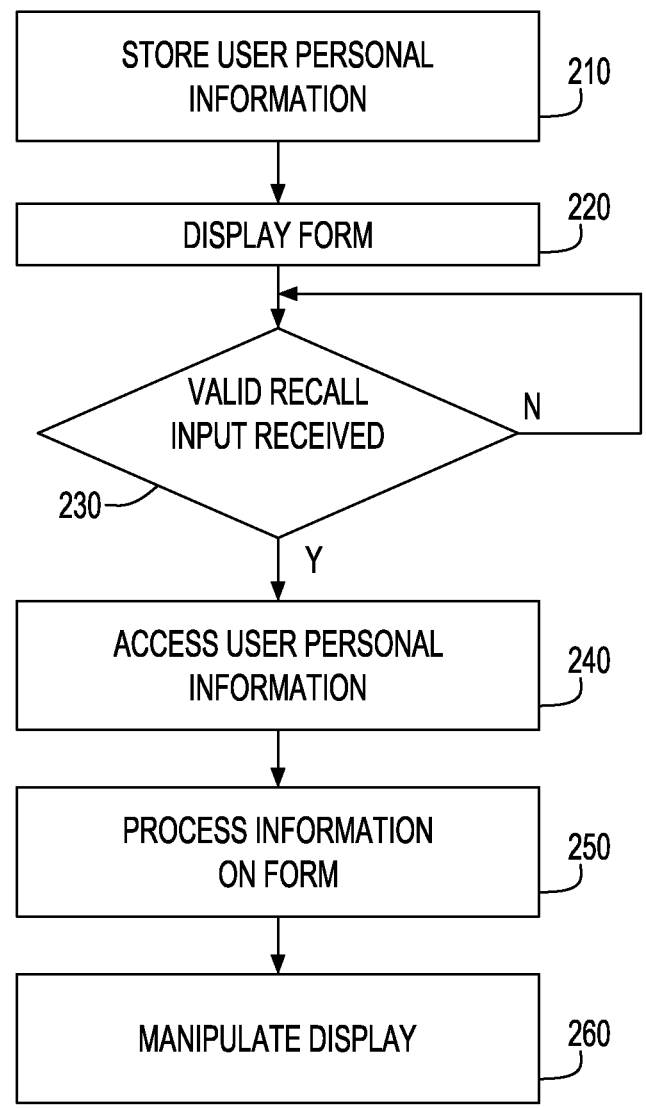
FIG. 3 is a flowchart illustrating steps in a method according to an exemplary embodiment of the invention.

Accordingly, within the above-described computing environment (FIGS. 1-2), a method will now be described for accessing personal information, i.e., information relating to a user's identity, address, phone number, birth date, deposit or credit accounts, etc., in connection with a form displayed at a user computer. Such method will be described with reference to the flowchart provided in FIG. 3. In an initial stage 210 of the method, user personal information is stored to permit subsequent access when needed in connection with a form. Personal information such as the user's name, address, phone number, birth date, account numbers for deposit and credit accounts, e.g., credit cards, expiration dates, etc., can be inputted by the user and stored to the user computer under conditions known to be secure. For example, a setup program can be executed for gathering the user personal information which will check for the presence of keylogger programs and other malicious programs and alert the user or remove such programs before allowing the user to input the personal information. The user may provide keystroke input to the computer by pressing character keys on a keyboard, or may input the information by using a mouse or other pointing device to click buttons on a screen which correspond to each character. Input may occur by any number of other available methods. A combination of input methods may be used: for example, without limitation, keyboard input together with input from a pointing device. Voice input, such as through a microphone and a voice recognition unit or optical input, such as through a scanner and an optical character recognition unit, may be used. A touchscreen may be used alone or in combination with one or more of the aforementioned input methods.

In a particular embodiment, input may be provided on a keyboard or other input interface of an auxiliary device, e.g., a handheld subcomputer device having a memory, where the auxiliary device is adapted to be connected to the user computer for communication therewith. As subcomputer, for example, a device having a keyboard and a memory can be used, e.g., a pocket organizer, label-maker, or other handheld information apparatus, having a communication interface for connection with the user computer.

Once inputted, the information is stored on the user computer, preferably in encrypted form. When the inputted information is provided to an auxiliary device, it may be encrypted before transmission to the user computer. Encrypted information received from the auxiliary device may be decrypted before storage on the user computer or may be reencrypted on the user computer and then stored.

Not all types of the aforementioned user personal information needs to be stored before performing the methods of accessing user personal information as described herein. The user may decide to only store some information such as a credit card number and not other information. Alternatively, the user may decide to store only certain identification information such as a full name, social security number and birth date. Clearly, there are innumerable possibilities and permutations of the combinations of personal information the user may wish to store on the user computer to avoid threats by keylogging programs.

By step 220, it is assumed that some user personal information has already been stored on the user computer and that the user wishes to provide that personal information to another person, such as to buy something over the Internet, or to access a bank account, etc. In step 220, a form is displayed which contains one or more fields awaiting input by the user. The fields may require input of nonsensitive information such as regarding a quantity or type of product for purchase or the fields may require personal information such as the user's social security number, or credit card number and expiration date.

Once the user personal information is already stored on the user computer (block 210), it is unnecessary for the user to input the required personal information to the form by way of the keyboard. Instead, after displaying a form (block 220), the user computer waits to receive recall input via the keyboard (block 230). The recall input, being different from the personal information, functions as a stand-in for the actual personal information. When a form is currently displayed on the user computer and a valid recall input is provided on the keyboard, the user computer uses the recall input to automatically access the previously stored personal information that corresponds to the recall input (block 240). The personal information accessed from storage then is automatically input to the form without requiring the personal information to be inputted at that time via the keyboard. The information on the form can then be processed (block 250). Processing typically occurs at another computer (e.g., computer 130a) to which the user computer transmits the information contained in the form through the network 120. For example, when computer 130a is a server computer, it may need the information on the form to permit the user to access a bank account over the network (e.g., to conduct "online banking") or the computer 130a may use the information on the form to obtain credit authorization for a purchase. It will be appreciated that these operations involve using the personal information to perform at least one of identifying the user of the computer, identifying an account of the user, or authenticating the user. Based on a result of the processing, information presented to the user by way of the display will generally change (block 260). At this step of the method, the user personal information, if present, may be blocked from being displayed at the user computer.

The accessing of user personal information by providing a recall input to the user computer can be best explained with an example. When the displayed form requires payment such as in form of a credit card number, a user wishing to input a previously stored number can input the characters "Card-AM" as indicated in FIG. 1 to recall the number of an American Express® credit card, for example. This previously stored and recalled credit card number then is input to the form at the user computer. As a result, the recalled number may appear on the form displayed on the screen. Alternatively, the recalled number may be blocked from being displayed but yet indicate the number of digits that have been inputted. In another variation, the recalled number may be blocked as well as the number of digits having been input.

As recall input, the user is free to create his or her own mnemonics for use in recalling the stored user personal information. The recall input is stored on the user computer in association with the user personal information so that the corresponding information can be recalled when the recall input is inputted to the user computer. A program on the user computer scans input from the keyboard and determines when the recall input has been provided via the keyboard. Such program can be referred to herein as a "security program." However, the term "security program" is not intended to refer to or imply any functions beyond those which are expressly described herein. Once the recall input has been provided to the user computer, the security program then accesses the corresponding stored personal information and inputs it to a corresponding block of the displayed form. Otherwise, if valid recall input has not been provided, the security program does not fill in the block of the displayed form.

To facilitate completing such forms, the security program may display a pull-down menu or one or more hints, should the user forget the mnemonics used to store recall inputs corresponding to the stored personal information. The user may then select an item from the pull-down menu, or provide recall input in accordance with a displayed hint.

To further facilitate the automatic completion of the displayed form by providing recall input through a user interface, the security program may compare the number of digits of input expected by the form with the number of digits of user personal information to be inputted to that block of the form. If the number of expected digits do not match to digits of personal information being supplied, the security program can output a warning to the display, a loudspeaker or both.

In a variation of the above-described embodiment, the security program checks for receiving the recall input by way of a graphical user interface at the user computer. For example, the recall input can be provided by selecting information, e.g., word information or character information, displayed on the screen.

In a variation of the above-described embodiment, the security program is modified to allow the user personal information to be stored remotely on a computer other than the user computer, e.g., a computer 130a. The security program may also allow the remotely stored personal information to be provided to a destination computer, e.g., the same computer or a third computer, e.g., another computer 130b, without first requiring the stored personal information to be transmitted again to the user computer. The security program allows the stored user personal information to be accessed by such other computer and provided to the destination when valid recall input is provided to the user computer.

In yet another variation, the security program may be designed to access stored user personal information only when the form is ready to be transmitted over the network 120 to a destination computer such as computer 130a or 130b. In such case, the security program can queue one or more recall inputs provided by the user in connection with the form and then only access the corresponding user personal information after the user provides input or command signaling that the form is to be transmitted. In such embodiment, the security program can reduce the amount of time that user personal information is accessed at the user computer, making the user personal information even less vulnerable to theft.

While the invention has been described in accordance with certain preferred embodiments thereof, many modifications and enhancements can be made thereto without departing from the true scope and spirit of the invention, which is limited only by the claims appended below.

The invention claimed is:

1. A method, comprising:
storing personal information of a particular user on a user information processing system, the personal information including a password or account number usable in populating a form comprising one or more fields;
displaying the form on a display of the user information processing system;
prior to receiving a plurality of inputs to the information processing system, automatically executing a check for malicious content within the user information processing system using a setup program that gathers the personal information to check for a presence of any keylogger programs;
in response to determining that the malicious content is within the user information processing system by the check, automatically enabling a removal of the malicious content using the setup program;
enabling a receipt of the personal information in response to determining that the malicious content is not within the user information processing system by the check or in response to the removal of the malicious content after determining that the malicious content is within the user information processing system by the check;
displaying a word or character via a graphical user interface presented by the display of the information processing system, the word or character comprising a recall input;
scanning the plurality of inputs to the user information processing system to validate a recall input by receiving as one of the plurality of inputs a selection of the word or the character;
utilizing the validated recall input to access and retrieve the personal information;
automatically populating the form including the one or more fields with the retrieved personal information,
wherein the access of the personal information and the automatically populating of the one or more fields are performed immediately after validating the recall input to reduce the amount of time that user personal information is accessed and vulnerable to theft.

2. The method of claim 1, further comprising:
receiving as the one of the plurality of inputs a set of keystrokes input via a keyboard in communication with the information processing system, the set of keystrokes providing the recall input.

3. The method of claim 1, wherein the personal information is stored on a second information processing system connected to the user information processing system via a network.

4. The method of claim 1, wherein the personal information includes a social security number, a birthdate, a home address, a telephone number, an account number, an expiration date of a credit card, and a userid.

5. The method of claim 1, wherein the automatic population of the form with the personal information via the recall input includes:
comparing a number of form characters with a number of personal information characters to be inputted to the form to determine whether the number of form characters matches the number of personal information characters; and
automatically populating of the form with the personal information via the recall input when the number of form characters matches the number of personal information characters.

6. The method of claim 1, wherein a security program is configured to queue one or more recall inputs, which includes the recall input, until the form is ready to be transmitted.

7. The method of claim 1, wherein a user input command indicated when the form is ready to be transmitted.

8. A system, comprising a processor and a memory storing program instructions thereon, the program instructions executable by a processor to cause the system to perform:
storing personal information of a particular user on a user information processing system, the personal information including a password or account number usable in populating a form comprising one or more fields;
displaying the form on a display of the user information processing system;
prior to receiving a plurality of inputs to the information processing system, automatically executing a check for malicious content within the user information processing system using a setup program that gathers the personal information to check for a presence of any keylogger programs;
in response to determining that the malicious content is within the user information processing system by the check, automatically enabling a removal of the malicious content using the setup program;
enabling a receipt of the personal information in response to determining that the malicious content is not within the user information processing system by the check or in response to the removal of the malicious content after determining that the malicious content is within the user information processing system by the check;
displaying a word or character via a graphical user interface presented by the display of the information processing system, the word or character comprising a recall input;
scanning the plurality of inputs to the user information processing system to validate a recall input by receiving as one of the plurality of inputs a selection of the word or the character;
utilizing the validated recall input to access and retrieve the personal information;
automatically populating the form including the one or more fields with the retrieved personal information,
wherein the access of the personal information and the automatically populating of the one or more fields are performed immediately after validating the recall input to reduce the amount of time that user personal information is accessed and vulnerable to theft.

9. The system of claim 8, the program instructions executable by the processor to cause the system to perform:
receiving as the one of the plurality of inputs a set of keystrokes input via a keyboard in communication with the information processing system, the set of keystrokes providing the recall input.

10. The system of claim 8, wherein the personal information is stored on a second information processing system connected to the user information processing system via a network.

11. The system of claim 8, wherein the personal information includes a social security number, a birthdate, a home address, a telephone number, an account number, an expiration date of a credit card, and a userid.

12. The method of claim 8, wherein the automatic population of the form with the personal information via the recall input includes:
comparing a number of form characters with a number of personal information characters to be inputted to the form to determine whether the number of form characters matches the number of personal information characters; and
automatically populating of the form with the personal information via the recall input when the number of form characters matches the number of personal information characters.

13. The system of claim 8, wherein a security program is configured to queue one or more recall inputs, which includes the recall input, until the form is ready to be transmitted.

14. The system of claim 8, wherein a user input command indicated when the form is ready to be transmitted.

* * * * *